United States Patent
Araujo (12)

(10) Patent No.: US 6,393,488 B1
(45) Date of Patent: May 21, 2002

(54) SYSTEM AND METHOD FOR SUPPORTING INTERNET PROTOCOL SUBNETS WITH NETWORK ADDRESS TRANSLATORS

(75) Inventor: Kenneth Araujo, Sunnyvale, CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/321,062

(22) Filed: May 27, 1999

(51) Int. Cl.$^7$ ................... G06F 15/16; G06F 15/173
(52) U.S. Cl. ................... 709/245; 709/238; 709/227
(58) Field of Search ................... 709/245, 238, 709/227, 225, 250

(56) References Cited

U.S. PATENT DOCUMENTS

| | | | | |
|---|---|---|---|---|
| 6,058,431 A | * | 5/2000 | Srisuresh et al. | 709/245 |
| 6,108,330 A | * | 8/2000 | Bhatia et al. | 370/352 |
| 6,128,664 A | * | 10/2000 | Yanagidate et al. | 709/228 |
| 6,266,707 B1 | * | 7/2001 | Boden et al. | 709/245 |
| 6,269,099 B1 | * | 7/2001 | Borella et al. | 370/389 |
| 6,304,908 B1 | * | 10/2001 | Kalajan | 709/229 |
| 6,327,662 B1 | * | 12/2001 | Araujo | 713/200 |

* cited by examiner

Primary Examiner—Zarni Maung
(74) Attorney, Agent, or Firm—Wagner Murabito & Hao LLP (57) ABSTRACT

A method and system for resolving network address translator (NAT) based internet protocol (IP) subnet address conflicts. In one embodiment of the present invention, a first NAT is used to assign an address to a first device which is coupled to the first NAT. Next, the present embodiment using a second NAT to assign an address to a second device coupled to the second NAT. Additionally, in the present embodiment, the second NAT automatically assigns an address to a link coupling the first NAT and the second NAT. The second NAT then assigns a second address to the second device. The second address is related to the address of the link coupling the first NAT and the second NAT. In so doing, the present invention insures that the second device has a second address associated therewith wherein the second address is different from the address of the first device. As a result, the present embodiment is able to resolve NAT-based subnet address conflicts. The present embodiment also eliminates the need for tedious user examination of all NAT-assigned IP addresses for each of the various NATs. Furthermore, the present embodiment is compatible with existing network address translator devices.

27 Claims, 7 Drawing Sheets

| PRIMARY LAN ADDRESS | ALTERNATIVE NON-CONFLICTING LAN ADDRESS |
|---|---|
| 168.1.450.1 | 192.1.370 |
| 168.1.450.2 | 192.1.380 |
| | |
| | |
| | |

SYSTEM AND METHOD FOR SUPPORTING INTERNET PROTOCOL SUBNETS WITH NETWORK ADDRESS TRANSLATORS

FIELD OF THE INVENTION

The present invention relates to the field of network communications. More particularly, the present invention relates to supporting internet protocol (IP) subnets with network address translators.

BACKGROUND OF THE INVENTION

As networks and the internet gain in popularity and users, the sheer number of devices coupled to various networks and to the internet have increased drastically. As a result, the vast number of different networks that communicate with each other but are under separate control and administration increases the difficulty of assigning each device a unique identifying address. One approach that effectively expands address capacity limitation is to provide address translation through a network address translator (NAT).

Typically a NAT facilitates the transmission of communications from one network to another network by performing an address translation for a device coupled thereto. In so doing, multiple devices effectively share a common address. That is, the NAT assigns an IP address to each of the devices coupled thereto. However, the addresses assigned by the NAT are not publicly-administered, routable, unique addresses. As a result, the are used only "behind" the NAT and are not passed beyond the NAT.

Figure 1:
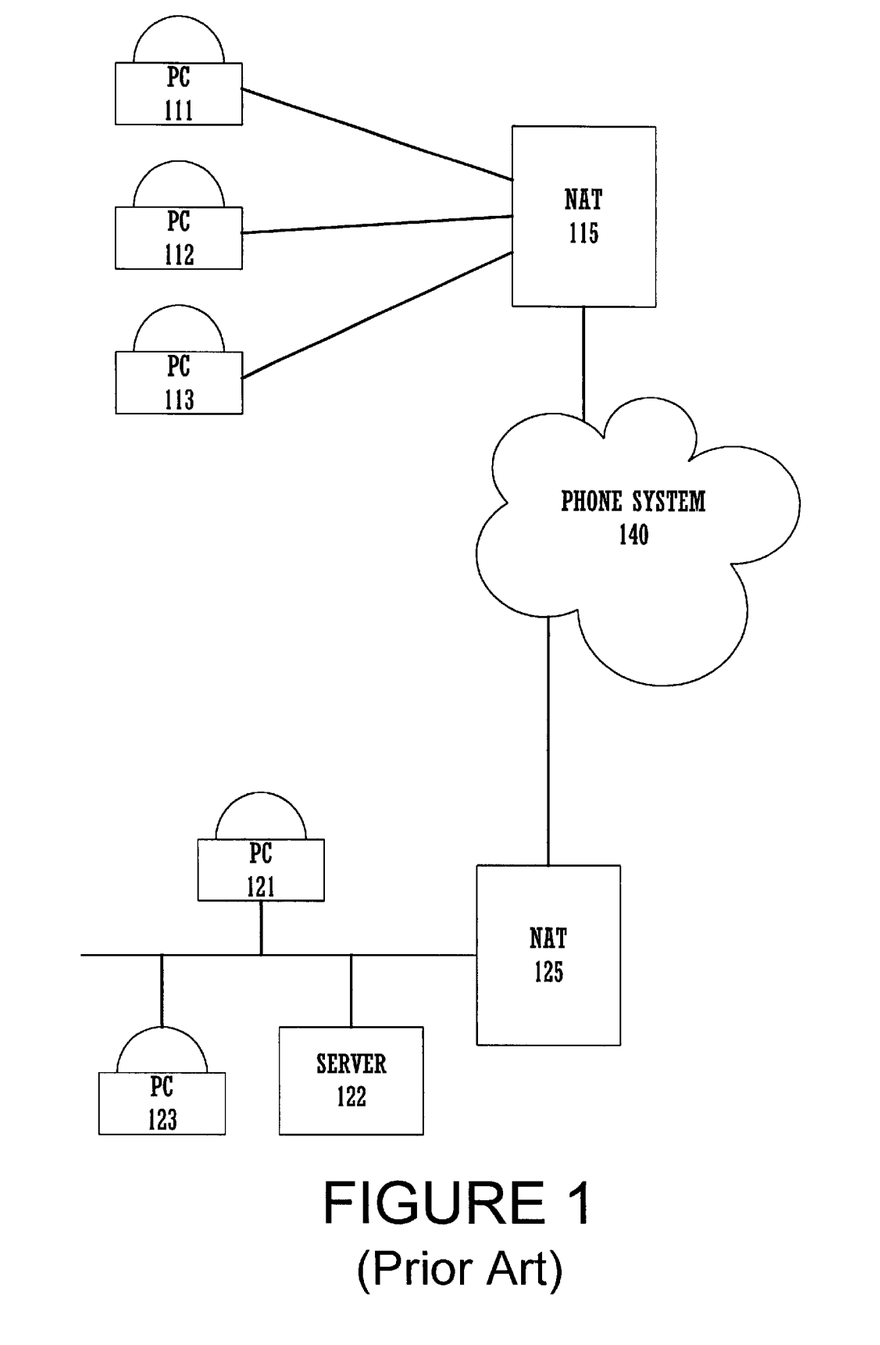
FIG. 1 is an example of a prior art network.

FIG. 1 is an example of a prior art network 100. Network 100 comprises a first network (e.g. a LAN), a second network (e.g. a LAN), and PC 131 all coupled to each other via phone system 140. The first LAN comprises PC 111, PC 112, and PC 113, all of which are coupled to network address translator (NAT) 115. The second LAN comprises PC 121, PC 123, and server 122 all of which are coupled to NAT 125. NAT 115 and NAT 125 are coupled to phone system 140 and provide translation between addresses of the first and second networks.

Unfortunately, the use of conventional NATs is not without problems. For example, because NATs may utilize similar software, two separate NATs may assign the same IP address to device coupled thereto. As an example, NAT 115 of Prior Art FIG. 1, may, for example, assign PC 111 an IP address of 192.168.1.2, assign PC 112 an IP address of 192.168.1.3, and assign PC 113 an IP address of 192.168.1.4. Similarly, NAT 125 of Prior Art FIG. 1, may, for example, assign PC 121 an IP address of 192.168.1.2, assign PC 123 an IP address of 192.168.1.3, and assign server 122 an IP address of 192.168.1.4. Because NATs 115 and 125 utilize similar address assigning schemes PC 111 and PC 121 now have the same address assigned thereto by their respective NAT. Likewise, PC 112 and PC 123 have the same address assigned thereto by their respective NAT, and PC 113 and server 122 now have the same address assigned thereto by their respective NAT. As a result, address conflicts may arise when, for example, PC 121 wishes to send data to PC 111. Because PC 121 and PC 111 share the same address, a subnet address conflict arises and the data cannot be appropriately handled. Similarly, PC 121 may wish to send data to PC 112. Because PC 112 and PC 123 have the same address, the data intended for PC 112 is instead handled as though it was intended for PC 123.

In one attempt to overcome such subnet address conflicts, prior art approaches require a user to examine all of the NAT-assigned IP addresses for each of the various NATs. The user must make sure that each device coupled to a NAT has a unique address assigned thereto. This process is usually relatively complicated and tedious. In many instances, the user is required to understand the intricacies of communication frame protocols and construct complicated and extensive tables that map types of communication frames to NAT ports and uniquely defined IP addresses. Furthermore, a solution to the above-listed problems should be compatible with existing NAT systems and designs.

Thus, a need exists for a network address translator system and method which is able to resolve NAT-based subnet address conflicts. Still another need exists for a network address translator system and method which meets the above need and which eliminates the need for tedious user examination of all NAT-assigned IP addresses for each of the various NATs. Yet another need exists for a network address translator system and method which meets the above-listed needs and which is compatible with existing network address translator devices.

SUMMARY OF THE INVENTION

The present invention provides a network address translator system and method which is able to resolve NAT-based subnet address conflicts. The present invention further provides a network address translator system and method which accomplishes the above achievement and which eliminates the need for tedious user examination of all NAT-assigned IP addresses for each of the various NATs. The present invention also provides a network address translator system and method which accomplishes the above-listed achievements and which is compatible with existing network address translator devices.

In one embodiment of the present invention, a first NAT is used to assign an address to a first device which is coupled to the first NAT. Next, the present embodiment using a second NAT to assign an address to a second device coupled to the second NAT. Additionally, in the present embodiment, the second NAT automatically assigns an address to a link coupling the first NAT and the second NAT. The second NAT then assigns a second address to the second device. The second address is related to the address of the link coupling the first NAT and the second NAT. In so doing, the present invention insures that the second device has a second address associated therewith wherein the second address is different from the address of the first device. As a result, the present embodiment is able to resolve NAT-based subnet address conflicts. The present embodiment also eliminates the need for tedious user examination of all NAT-assigned IP addresses for each of the various NATs. Furthermore, the present embodiment is compatible with existing network address translator devices.

These and other objects and advantages of the present invention will no doubt become obvious to those of ordinary skill in the art after having read the following detailed description of the preferred embodiments which are illustrated in the various drawing figures.

DESCRIPTION OF THE DRAWINGS

The accompanying drawings which are incorporated in and form a part of this specification, illustrate embodiments of the invention and together with the description, serve to explain the principles of the invention.

PRIOR ART

The drawings referred to in this description should be understood as not being drawn to scale except if specifically noted.

BEST MODE FOR CARRYING OUT THE INVENTION

Reference will now be made in detail to the preferred embodiments of the invention, a virtual private network infiltration prevention system, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

The system and method of the present invention automatically configures information a NAT utilizes to perform address translations and communication frame distribution. One embodiment of the present invention is implemented in an automatic NAT configuration system. The automatic NAT configuration system facilitates the connection of communication paths between devices included in one network (e.g. a primary LAN) of the NAT and devices included in other networks. Communication frames of varying types or associated with different applications are transmitted by the automatic NAT configuration system to devices included in a primary LAN. The primary LAN addresses of devices responding to the transmissions are automatically mapped in a configuration table to the corresponding type of communication frames or application. The automatic NAT configuration system then utilizes the information in the mapped configuration table to translate network addresses between different networks and establish appropriate communication paths.

Figure 2:
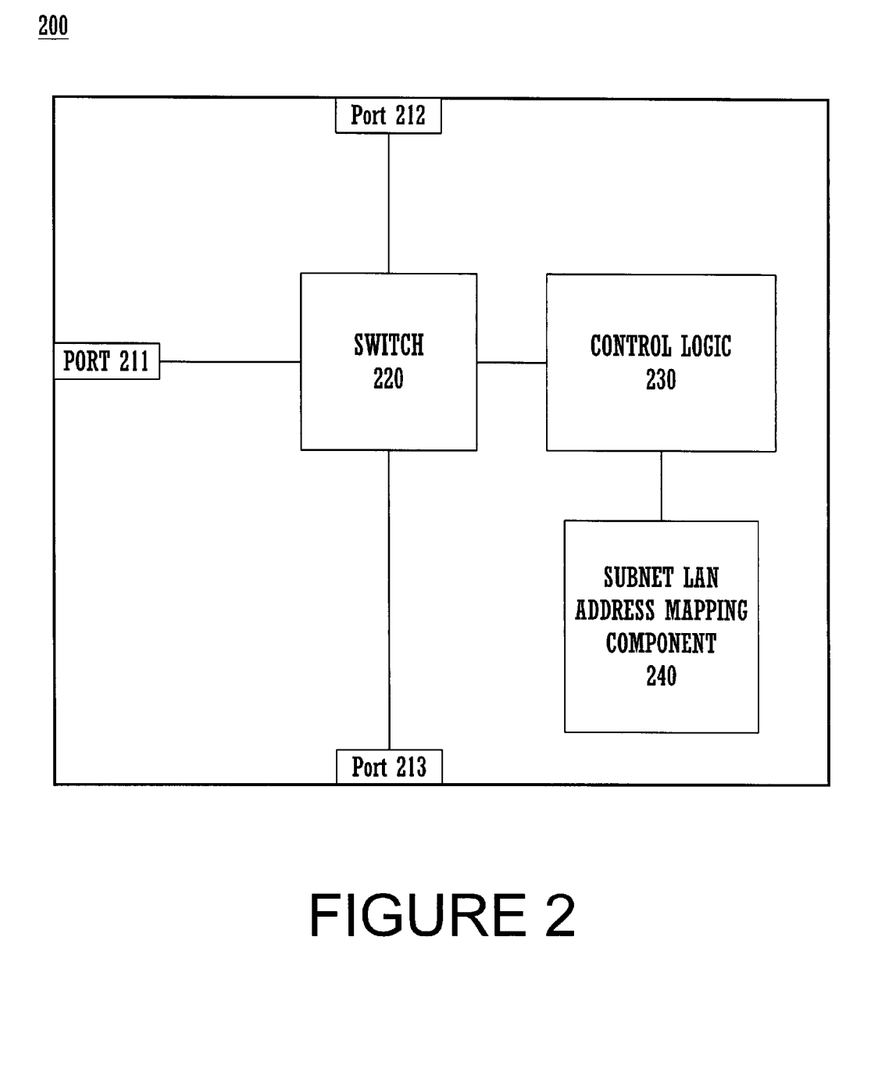
FIG. 2 is a block diagram illustrating one embodiment of a NAT subnet support system of the present invention.

FIG. 2 is a block diagram illustrating NAT subnet support system 200, one embodiment of the present invention. NAT subnet support system 200 comprises input/output ports 211 through 213, switch 220, control logic 230 and subnet address mapping component 240. Input/output ports 211 through 213 are coupled to switch 220. Switch 220 is coupled to control logic 230 which is coupled to subnet address mapping component 240. Input/output ports 211 through 213 are network ports that facilitate the coupling of communication media to NAT subnet support system 200. The communication media are also coupled to various exterior devices (not shown). At least one of the input/output ports 211 through 213 is coupled to a network that is different than the other input/output ports 211 through 213. For example in one embodiment input/output ports 211 and 212 are coupled to a primary LAN of NAT subnet support system 200 and input/output port 213 is coupled to a WAN such as a public phone system.

The components of NAT subnet support system 200 interact with one another to facilitate communications between devices coupled to NAT subnet support system 200. Switch 220 provides communication path connections between ports 211 through 213 configured in multiple arrangements. Control logic 230 controls the coupling configurations implemented by switching matrix 220 and automatic support of subnet address differentiation. Subnet LAN address mapping component 240 facilitates subnet IP address differentiation and in some embodiments stores information related to the support of subnet address resolution.

NAT subnet support system 200 analyzes the LAN addresses of devices included in its primary LAN and the addresses of devices included in the primary LANs of other NATs or NAT subnet support systems. In one embodiment of the present invention, control logic 230 of NAT subnet support system 200 is capable of intelligently recognizing if either a destination or source address of a device not included in a primary LAN of NAT subnet support system 200 is the same address as a device included in the primary LAN of NAT subnet support system 200. If a destination or source address of a device not included in a primary LAN of NAT subnet support system 200 is the same address as a device included in the primary LAN of NAT subnet support system 200, NAT subnet support system 200 creates an alternative address. NAT subnet support system 200 inserts the alternative address in a communication frame destined from the device included in the primary LAN of NAT subnet support system 200 to another network and utilizes the alternative address to identify responses intended for the device included in the primary LAN of NAT subnet support system 200. When a response is received NAT subnet support system 200 translates between the alternative address and the original primary LAN address.

Although NAT subnet support system 200 is described in terms of one embodiment of the present invention, it should be appreciated the present invention is also well suited for use in other applications. For example, in some situations automatic NAT configuration system 200 is implemented between a LAN and a WAN and in other circumstances automatic NAT configuration system 200 is utilized in between other network arrangements, such as between two LANs. In one embodiment, NAT subnet support system 200 is implemented in a virtual private network (VPN) established via the Internet. In some embodiments communications through switches of NAT subnet support system 200 and subnet address support are controlled by software. In yet other embodiments the present invention is implemented in combinations of software, hardware and firmware which automatically creates and translate between alternative addresses and forward communication frames to and from devices coupled to NAT subnet support system 200.

Figure 3:
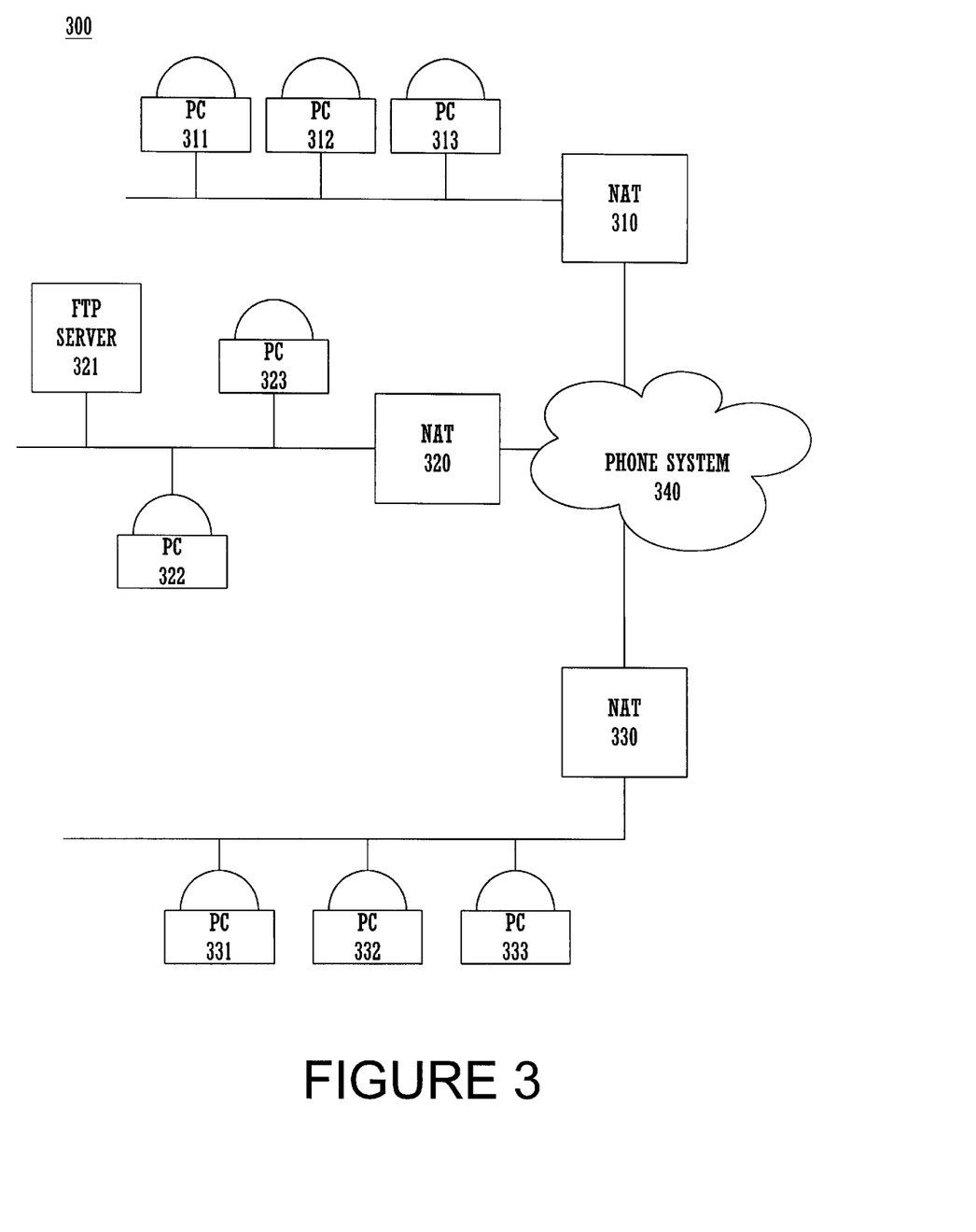
FIG. 3 illustrates one embodiment of a network that utilizes a NAT subnet support system and method of the present invention to facilitate appropriate address translation of devices included in different LANs included in the same subnet.

FIG. 3 illustrates one embodiment of a network 300 that utilizes an NAT subnet support system and method of the present invention to facilitate appropriate address translation of devices included in different LANs included in the same subnet. Network 300 comprises NAT subnet support system 310, 320 and 330, public phone system 340, personal computer (PC)311, 312, 313, 322, 323, 331, 332, and 333, and file transfer protocol (FTP) device 321. In one embodiment NAT subnet support system 310, 320 and 330 are similar to NAT subnet support system 200. NAT subnet support system 310, PC 311, PC 312, and PC 313 are included in a primary LAN of NAT subnet support system 310. NAT subnet support system 320, FTP device 321, PC 322, and PC 323 are included in a primary LAN of NAT subnet support system 320. NAT subnet support system 330, PC 331, PC 332, and PC 333 are included in a primary LAN of NAT subnet support system 330. Public phone system 340 is coupled to NAT subnet support system 310, 320 and 330.

The components of network 300 interact with one another to provide a user with versatile and dynamic networked computer facilities capable of executing a variety of applications. FTP device 321 stores various files related to different applications. In one embodiment of the present invention, the primary LANs of NAT subnet support system 310, 320 and 330 are implemented in different locations of a small business. FTP device 370 includes a list of customers and their billing information for the small business. Public phone system 340 provides communication services that enable communication links to be established between the different LANs of NAT subnet support system 310, 320 and 330. PC 311, 312, 313, 322, 323, 331, 332, and 333 are personal computers that enable their users to interact with devices coupled to the primary LANs of NAT subnet support system 310, 320 and 330 and phone system 340. Public phone system 340 facilitates communications between devices including devices coupled to the primary LANs of NAT subnet support system 310, 320 and 330. NAT subnet support system 310, 320 and 330 function as part of the communication paths between devices included in the primary LANs of NAT subnet support systems 310, 320 and 330 and public phone system 340. NAT subnet support systems 310, 320 and 330 also translate network addresses, direct communication traffic to and from the translated addresses and assign addresses to device included in their respective primary LANs.

In one embodiment of network 300, NAT subnet support system 310, 320 and 330 use the same software to assign primary LAN addresses to devices included in their respective primary LANs. For example, NAT subnet support system 310 assigns primary LAN addresses of 192.1.1 to PC 311, 192.1.2 to PC 312 and 192.1.3 to PC 313. NAT subnet support system 320 assigns primary LAN addresses of 192.1.1 to FTP server 321, 192.1.2 to PC 322 and 192.1.3 to PC 323. NAT subnet support system 330 assigns primary LAN addresses of 192.1.1 to PC 331, 192.1.2 to PC 332 and 192.1.3 to PC 333. NAT subnet support systems 310, 320 and 330 automatically determine if there is a potential conflict between LAN addresses, such as devices in different LANs trying to communicate with one another, and take appropriate steps to uniquely identify each piece of equipment.

In one embodiment of the present invention, NAT subnet support system 320 automatically produces alternative address translation information for communication frames directed to devices included in the primary LAN of NAT subnet support system 320 from devices not included in the primary LAN of NAT subnet support system 320. NAT subnet support system 320 includes a directory name service (DNS) that provides a mapping of designated in a uniform resource locating (URL) protocol names to LAN IP addresses. NAT subnet support system 320 receives communication frames from destinations with various addresses directed to a device included in its primary LAN. If a device included in the primary LAN of NAT subnet support system 320 has the same address as a device included in a different network forwarding the communication frame to NAT subnet support system 320, NAT subnet support system 320 notifies the other network that the appropriate identification for the device included in the primary LAN of NAT subnet support system 320 is an alternative address. For example, if a user on PC 333 forwards a URL names associated with FTP server 321 (e.g., FTPSERVER.COM) to NAT subnet support system 320 for resolution, NAT subnet support system 320 responds with an alternative address (e.g., 192.1.15). The alternative address avoids a potential confusion regarding the NAT subnet support system 320 primary LAN address of 192.1.1 assigned to FTP server 321 and NAT subnet support system 330 primary LAN address of 192.1.1. assigned to PC 331.

In another embodiment of network 300 NAT subnet support system 330 provides an alternative address for PC 333. In this situation, if a user on PC 333 forwards a URL names associated with FTP server 321 (e.g., FTPSERVER.COM) to NAT subnet support system 320 for resolution, NAT subnet support system 320 responds with the 192.1.1 NAT subnet support system 320 primary LAN address for FTP server 321. NAT subnet support system 330 recognizes that PC 331 already has a NAT subnet support system 320 primary LAN address of 192.1.1 and assigns an alternative source address (e.g. 168.1.1) in communication frames from PC 333 to FTP server 321 and provides translations to 192.1.3 NAT subnet support system 330 LAN address for communication frames indicating the alternative address as a destination.

Figure 4:
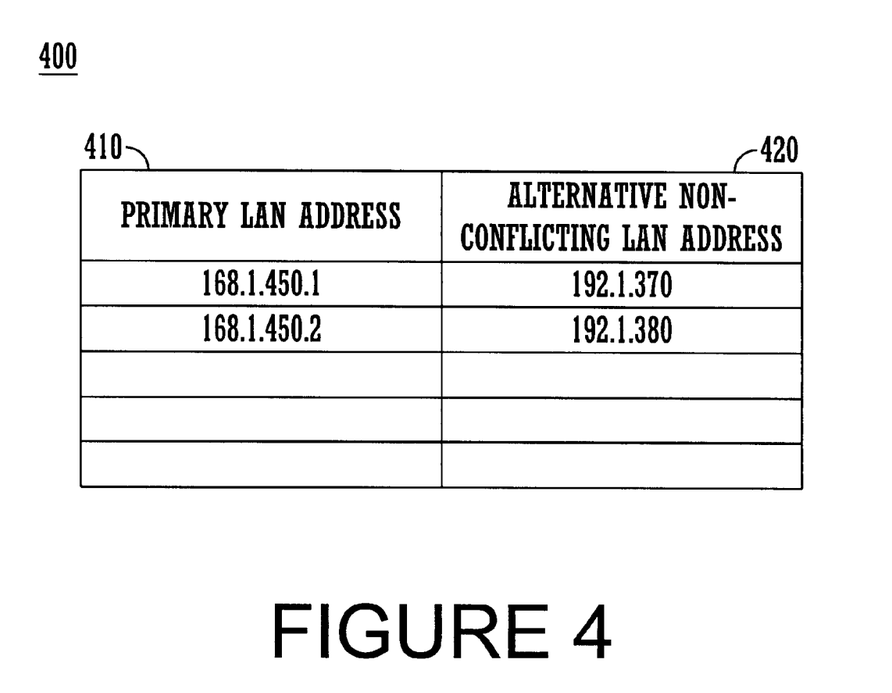
FIG. 4 is an example of one embodiment of an alternative address mapping table.

FIG. 4 is an example of one embodiment of an alternative address mapping table 400. Alternative address mapping table 400 comprises multiple rows arranged in two columns including a first column 410 and a second column 420. Entries in a first column 410 indicate a primary LAN address of devices included in the NAT subnet support system implementing alternative address mapping table 400. Data in the second column 420 designates an alternative address for the devices included in the NAT subnet support system implementing alternative address mapping table 400. The addresses in each row are associated with the same device. Alternative address mapping table 400 is automatically constructed by a NAT subnet support system.

In one embodiment of the present invention, NAT subnet support system 320 automatically creates an alternative address mapping table 400 by analyzing source and destination addresses in communication frames it receives and the addresses of devices included in its primary LAN. In one embodiment of the present invention, NAT subnet support system 320 examines the source addresses in communication frames it receives and determines if the source address is the same as an address of a device included in its primary LAN. For example, NAT subnet support system 320 compares the source address in a communication frame to its list of primary LAN addresses. If the source address in a communication frame matches a primary LAN addresses, NAT subnet support system 320 creates an alternative address mapping table. In generating an alternative address mapping table, NAT subnet support system 320 selects alternative addresses that do not match any of the devices included in the primary LAN of NAT subnet support system 320.

In another embodiment of the present invention, NAT subnet support system 320 examines the destination addresses in communication frames it receives and determines if the destination address is the same as an address of a device included in its primary LAN. If the destination address is the same as an address of a device included in its primary LAN, NAT subnet support system 320 creates an alternative address mapping table and inserts alternative addresses included in the alternative address mapping table in communication frames destined for other networks. If the other network sends a response indicating the alternative address as the destination, NAT subnet support system 320 translates the alternative address into the appropriate primary LAN address and forwards the communication frame to the appropriate LAN device.

Figure 5:
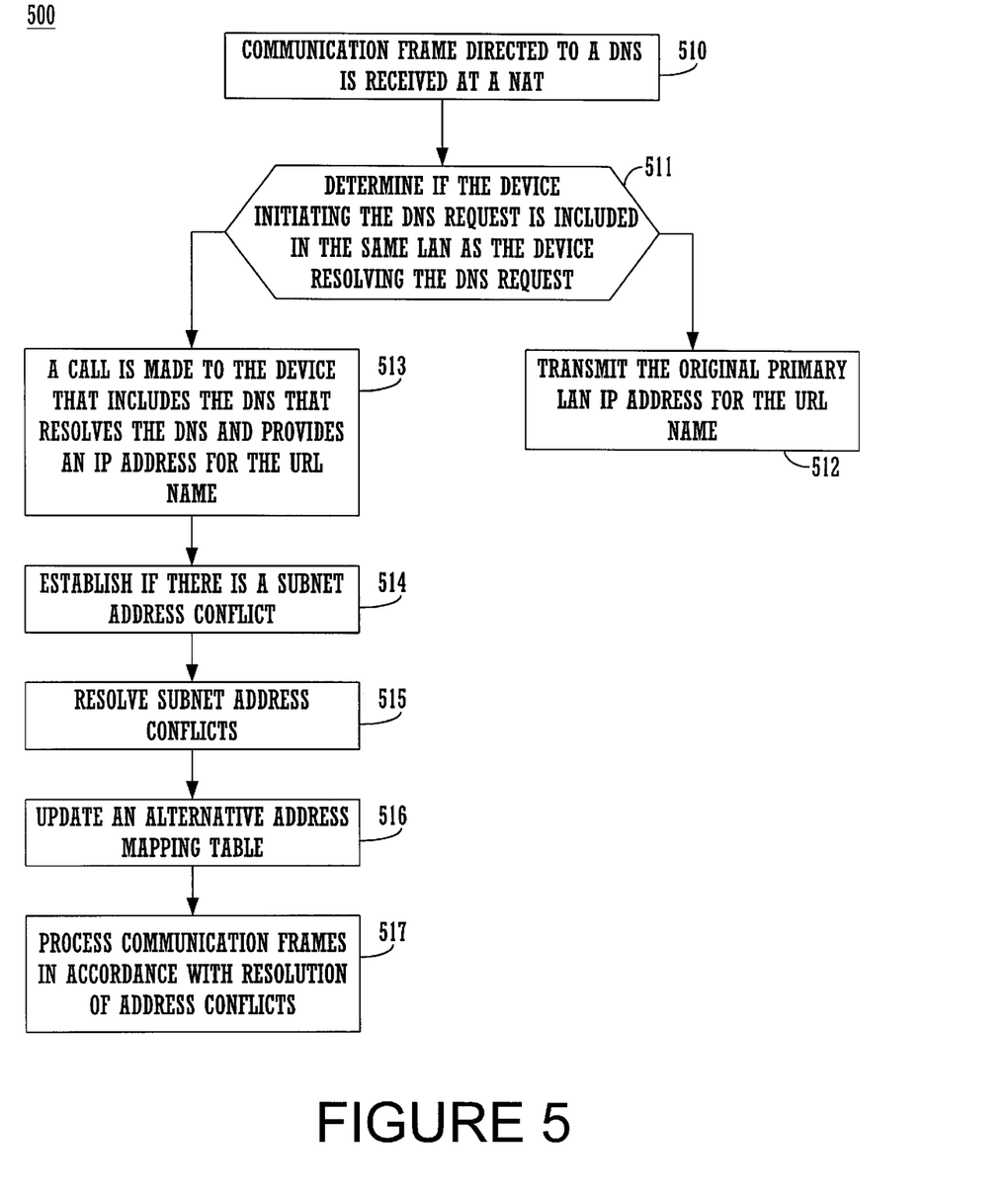
FIG. 5 is one embodiment of an automated NAT subnet support method.

FIG. 5 is one embodiment of an automated NAT subnet support method 500. Automated NAT subnet support method 500 automatically assigns an alternative address to devices with a primary LAN address that is the same as a device in another network. In one embodiment of the present invention, automated NAT subnet support method 500 is not engaged if an address included in the primary LAN of a NAT is not the same as an address in another network.

In step 510 a communication frame is received by a NAT (e.g., NAT subnet support system 320). In one embodiment, the communication frame is a DNS request for a primary LAN address associated with a service included in the primary LAN of NAT subnet support system 320. For example, the communication frame is associated with a request directed to a DNS for the primary LAN address of a uniform resource locator (URL) name of an FTP server (FTP.com).

In step 511 automated NAT subnet support method 500 determines if the device resolving the DNS is included in the same LAN as the device initiating the URL request. If the device resolving the DNS is included in the same LAN as the device initiating the URL request the process proceeds to step 512. If the device resolving the DNS is not included in the same LAN as the device initiating the URL request automated NAT subnet support method 500 proceeds to step 513.

In step 512 the original primary LAN IP address associated with the URL name is transmitted to the requesting device. In one embodiment of the present invention, the original primary LAN IP address associated with the URL name is transmitted to the requesting device by performing a network address translation operation between the original primary LAN IP address associated with the URL name and an address of another network and forwarding the communication frame to the other network.

In step 513 a call is made to a device that includes the DNS that resolves a URL name and the URL name is forwarded to the DNS device. The DNS locates the address of the device associated with the URL name.

In step 514 automated NAT subnet support method 500 establishes if there is a conflict between the address of the device that initiated the DNS request and devices included in the same primary LAN as the device associated with the URL name. If there is no conflict the process proceeds to step 512. If there is a conflict the process proceeds to step 515. In one embodiment automated NAT subnet support method 500 examines a source identifier in a communication frame and compares it to addresses included in its primary LAN addresses. In another embodiment automated NAT subnet support method 500 analyzes a destination identifier in a communication frame and contrasts it to addresses included in its primary LAN addresses.

In step 515 automated NAT subnet support method 500 resolves subnet address conflicts. In one embodiment of the present invention automated NAT subnet support method 500 provides an alternative non-conflicting destination address to the requesting device. In another embodiment of the present invention of automated NAT subnet support method 500 supplies an alternative non-conflicting source address to a receiving device.

In step 516 an alternative address mapping table is updated to reflect the creation and assignment of an alternative non-conflicting address. In one embodiment of the present invention the alternative address mapping tracks alternate non-conflicting source addresses. In another embodiment of automated NAT subnet support method 500 the alternative address mapping stores alternate non-conflicting destination addresses.

In step 517 communication frames are processed in accordance with alternative non-conflicting addresses. Appropriate network address translations are performed between alternative non-conflicting addresses and original primary LAN addresses. In one embodiment of automated NAT subnet support method 500 an alternative address corresponding to the response to the DNS request is forwarded to requesting device.

Figure 6:
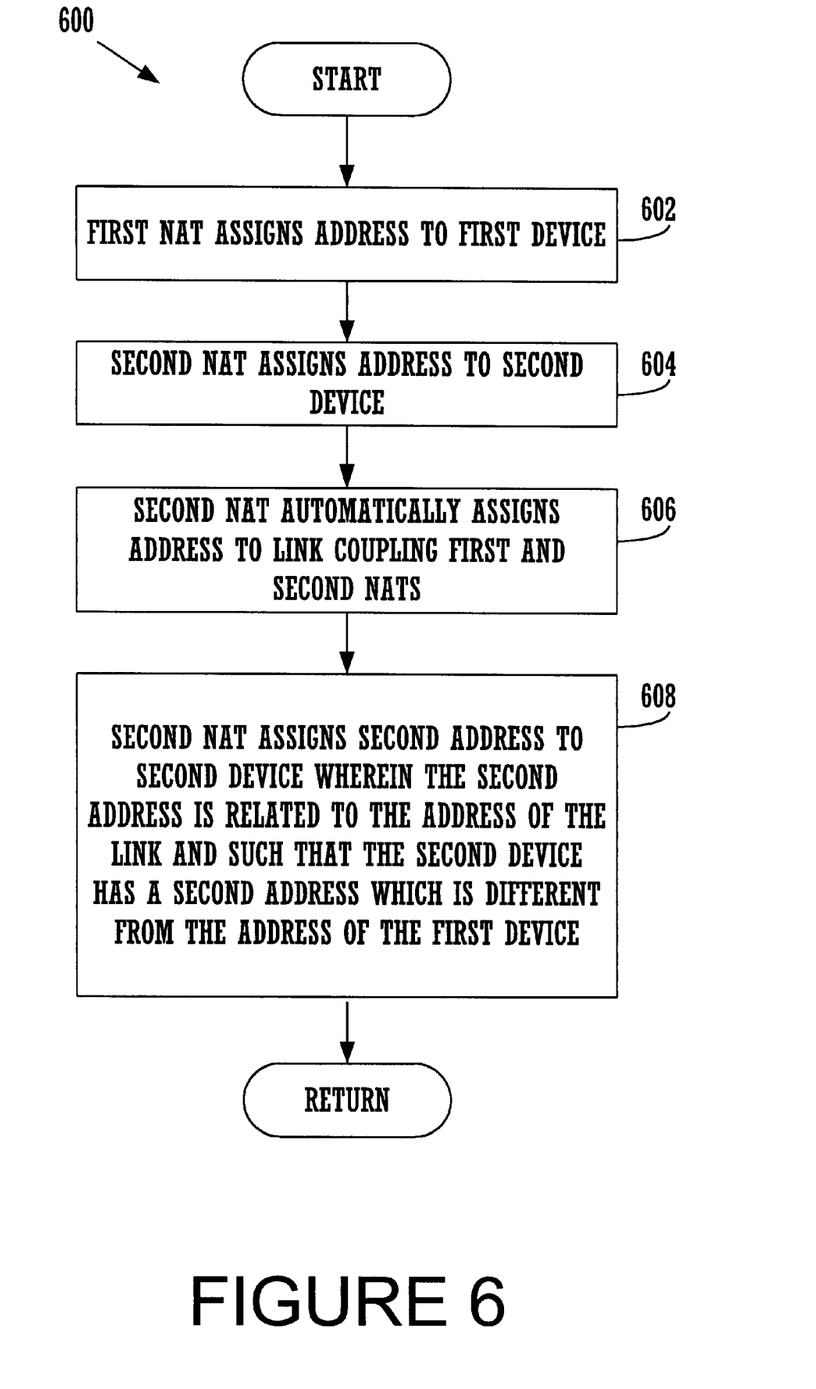
FIG. 6 is a flow chart of steps performed in accordance with one embodiment of the present claimed invention.

With reference next to FIG. 6, a flow chart 600 of steps performed in accordance with another embodiment of the present invention is shown. For purposes of clarity, the steps of FIG. 6 will be described in conjunction with the features of FIG. 7. As shown in step 602, in the present embodiment, a first NAT (e.g. NAT 115) assigns an address to a first device (e.g. PC 111) coupled thereto. In this example, and for purposes of illustration, it will be assumed that NAT 115 assigns an address of 192.168.1.1 to PC 111. It will be understood that NAT 115 may also assign various other addresses to the other devices (e.g. PC 112 and PC 113) coupled thereto.

Figure 7:
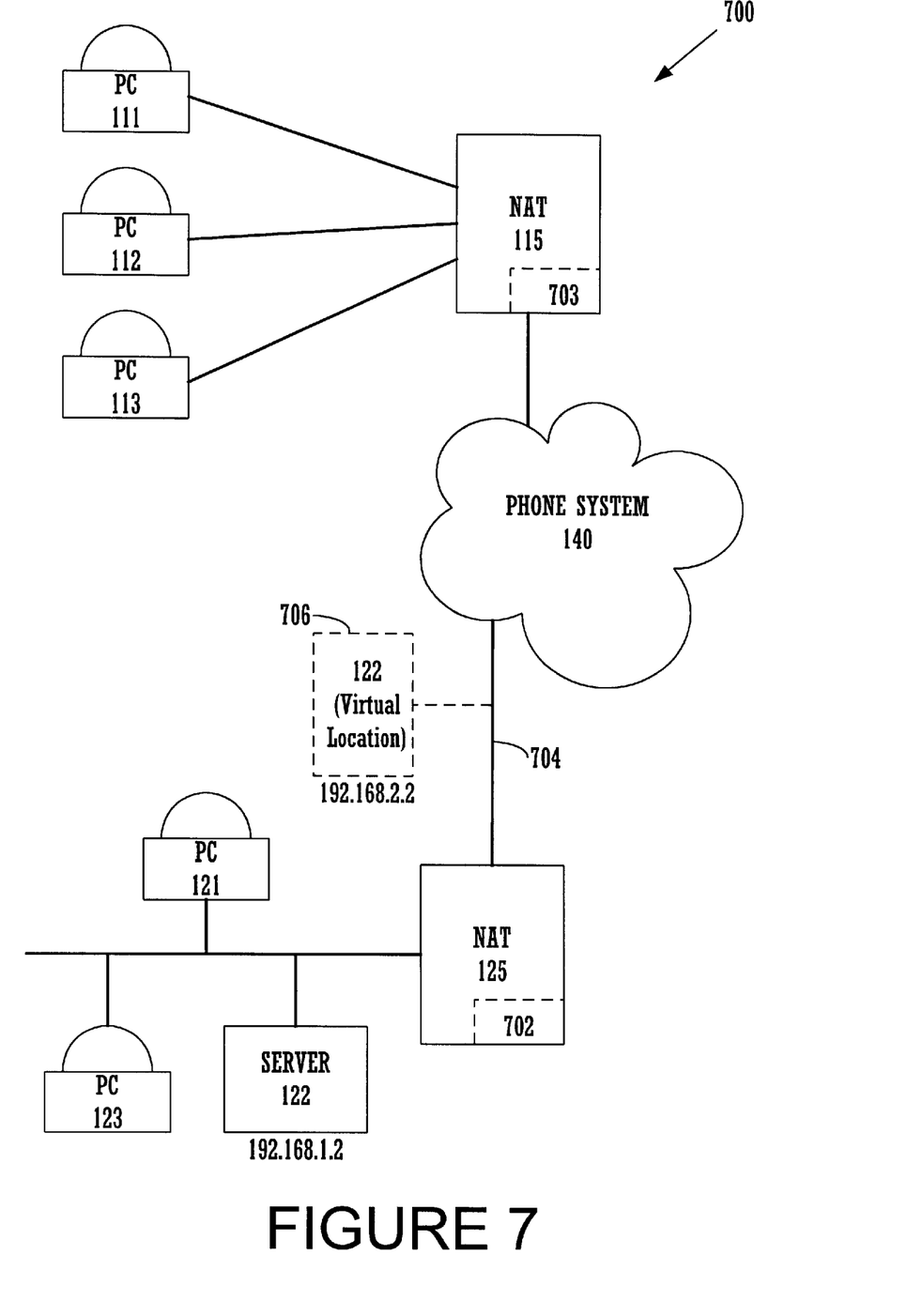
FIG. 7 is a schematic diagram of component and features present in one embodiment of the present claimed invention.

At step 604, in the present embodiment, a second NAT (e.g. NAT 125) assigns an address to a second device (e.g. server 122) coupled thereto. In this example, and for purposes of illustration, it will be assumed that NAT 125 assigns an address of 192.168.1.1 to server 122. It will be understood that NAT 125 may also assign various other addresses to the other devices (e.g. PC 121 and PC 123) coupled thereto. As seen from steps 602 and 604, in this example, PC 111 and server 122 have been assigned the same address by their respective NAT. As a result, in the prior art address conflicts would arise when, for example, server 122 wishes to send data to PC 111. Because server 122 and PC 111 share the same address, a subnet address conflict arises and the data cannot be appropriately handled. Similarly, PC 123 may wish to send data to PC 111. Because PC 111 and server 122 have the same address, the data intended for PC 111 is instead handled as though it was intended for server 122. As described below, the present embodiment resolves such subnet address conflicts.

At step 606, NAT 125 automatically assigns an address to the link 704 coupling NAT 115 and NAT 125. In this example, and for purposes of illustration, it will be assumed that NAT 125 assigns an address of 192.168.2.1 to link 704. More specifically, NAT 115 and NAT 125 negotiate addresses for themselves on link 704. These addresses are, therefore, in a unique subnet from the subnets associated with the devices behind NATs 115 and 125. In the present embodiment, a control logic component 702 of NAT 125 is used to assign the address (192.168.2.1) to link 704 coupling NAT 115 and NAT 125. In the present embodiment, control logic component 702 is, for example, a set of instructions adapted to operate using the internal hardware of NAT 125.

Control logic component 702 is also used to inform NAT 115 of the creation of the new address or addresses. Similarly, in the present embodiment, a control logic component 703 of NAT 115 is adapted to perform similar functions. In the present embodiment, control logic component 703 is, for example, a set of instructions adapted to operate using the internal hardware of NAT 115.

Next, at step 608, NAT assigns a second address to server 122. In this example, and for purposes of illustration, it will be assumed that NAT 125 assigns an address of 192.168.2.2 to server 122. Thus, the second address (192.168.2.2) for server 122 is related to the address (i.e. 192.168.2.1) of link 704 coupling NAT 115 and NAT 125. In the present embodiment, control logic component 702 of NAT 125 is used to assign the second address (192.168.2.2) to server 122.

Referring still to step 608, in essence, server 122 now appears to have a virtual location 706 on link 704 coupling NAT 115 and NAT 125. As a result, server 122 has a second address (192.168.2.2) associated therewith wherein the second address is different from the address (192.168.1.2) of PC 111. Thus, NATs 115 and 125 can now appropriately handle the transfer of data between server 122 and PC 111 even though each of the devices was initially assigned the same address by their respective NAT. As an example, when NAT 115 receives a request to send data to address 192.168.1.2 (i.e. server 122), upon determining that the data is not for PC 111, NAT 115 sends the data to the new address (i.e. 192.168.2.2) of server 122. More specifically, in the present embodiment, a user (e.g. PC 113) behind NAT 115 would attempt to initiate, for example, an FTP session with a device having a particular name (e.g. FTP1.company1.com). PC 113 will then send a DNS request asking for resolution of the name "FTP1.company1.com" to NAT 115. NAT 115 will have been configured to forward all DNS requests pertaining to names in "company1.com" to NAT 125 (via e.g. a circuit switched call. Upon receipt of the DNS request, NAT 125 will respond with the second address (192.168.2.2) of server 122. NAT 115 also inserts its own address as the source of the data. When the data, having as a destination address the new address (i.e. 192.168.2.2) of server 122, is received by NAT 125, NAT 125 is able to translate (via prior communication with NAT 115) the new address (i.e. 192.168.2.2) of server 122 to the original address (192.168.1.2) of server 122. Thus, the data is then passed to server 122.

Thus, the present invention provides a network address translator system and method which is able to resolve NAT-based subnet address conflicts. The present invention further provides a network address translator system and method which accomplishes the above achievement and which eliminates the need for tedious user examination of all NAT-assigned IP addresses for each of the various NATs. The present invention also provides a network address translator system and method which accomplishes the above-listed achievements and which is compatible with existing network address translator devices.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An automatic network address translator (NAT) configuration system comprising:

a first NAT having first device coupled thereto, said first NAT adapted to assign an address to said first device;

a second NAT having second device coupled thereto, said second NAT adapted to assign an address to said second device, said second NAT further adapted to automatically assign an address to a link coupling said first NAT and said second NAT, said second NAT further adapted to assign a second address to said second device coupled to said second NAT, said second address related to said address of said link coupling said first NAT and said second NAT such that said second device has a second address associated therewith wherein said second address is different from said address of said first device.

2. The automatic network address translator (NAT) configuration system of claim 1 wherein said second NAT further comprises a control logic component for assigning said address to said link.

3. The automatic network address translator (NAT) configuration system of claim 2 wherein said control logic component is further adapted for assigning said second address to said second device.

4. A method for resolving network address translator (NAT) based internet protocol (IP) subnet address conflicts, said method comprising the steps of:

a) using a first NAT to assign an address to said first device coupled thereto;

b) using a second NAT to assign an address to said second device coupled thereto;

c) said second NAT automatically assigning an address to a link coupling said first NAT and said second NAT; and d) said second NAT assigning a second address to said second device coupled to said second NAT, said second address related to said address of said link coupling said first NAT and said second NAT such that said second device has a second address associated therewith wherein said second address is different from said address of said first device.

5. The method for resolving network address translator (NAT) based internet protocol (IP) subnet address conflicts as recited in claim 4 wherein step c) comprises:

using a control logic component of said second NAT to assign said address to said link coupling said first NAT and said second NAT.

6. The method for resolving network address translator (NAT) based internet protocol (IP) subnet address conflicts as recited in claim 4 wherein step d) comprises:

using a control logic component of said second NAT to assign to said second device said second address related to said link coupling said first NAT and said second NAT.

7. An automatic network address translator (NAT) subnet support system, comprising:

a switch adapted to facilitate establishment of a communication link between a first device included in a primary local area network (LAN) and a second device included in a wide area network (WAN);

a control logic component coupled to said switch, said control logic component adapted to control said switch operations and resolution of subnet address conflicts; and a subnet LAN address mapping component coupled to said control logic component, said subnet LAN address mapping component adapted to facilitate resolution of subnet address conflicts.

8. The automatic NAT subnet support system of claim 7 wherein said subnet LAN address mapping component further comprises a memory component.

9. The automatic NAT subnet support system of claim 7 wherein said subnet LAN address mapping component further comprises a communication frame type mapping table.

10. The automatic NAT subnet support system of claim 7 further comprising input/output ports.

11. The automatic NAT subnet support system of claim 7 further comprising a personal computer coupled to said automatic NAT subnet support system, said personal computer adapted to transmit a communication frame to said automatic NAT subnet support system.

12. The automatic NAT subnet support system of claim 11 further comprising a primary local area network (LAN) coupled to said automatic NAT subnet support system, said personal computer adapted to transmit and receive a communication frame to and from said automatic NAT subnet support system.

13. An automatic network address translator (NAT) subnet support system comprising:
   a switch adapted to facilitate establishment of a communication link between a first device included in a primary local area network (LAN) and a second device included in a wide area network (WAN);
   a control logic component coupled to said switch, said control logic component adapted to control said switch operations and automatic configuration of said automatic NAT configuration system; and
   a frame type mapping component coupled to said control logic component, said frame type mapping component adapted to facilitate resolution of address conflicts by creating and tracking alternative non conflicting addresses.

14. The automatic NAT subnet support system of claim 13 wherein said subnet LAN address mapping component further comprises a memory component.

15. The automatic NAT subnet support system of claim 13 wherein said subnet LAN address mapping component further comprises a communication frame type mapping table.

16. The automatic NAT subnet support system of claim 13 further comprising input/output ports.

17. The automatic NAT subnet support system of claim 13 further comprising a personal computer coupled to said automatic NAT subnet support system, said personal computer adapted to transmit a communication frame to said automatic NAT subnet support system.

18. The automatic NAT subnet support system of claim 17 further comprising a primary local area network (LAN) coupled to said automatic NAT subnet support system, said personal computer adapted to transmit and receive a communication frame to and from said automatic NAT subnet support system.

19. An automated NAT subnet support method that automatically assigns an alternative address to devices with a primary local area network (LAN) address that is the same as a device in another network comprising the steps of:
   a) receiving a directory name service (DNS) request communication frame by a NAT;
   b) determining if the device resolving said DNS request is included in the same LAN as the device initiating the DNS request;
   c) making a call to a device that includes a DNS device that resolves a universal resource locator (URL) name;
   d) forwarding said URL name to said DNS device;
   e) establishing if there is a conflict between an address of a device that initiated said DNS request and devices included in the same primary LAN as a device associated with said URL name; and
   f) resolving subnet address conflicts.

20. The automated NAT subnet support method of claim 19 further comprising the steps of:
   updating an alternative address mapping table to reflect the creation and assignment of an alternative non-conflicting address; and
   processing communication frames in accordance with alternative non-conflicting addresses.

21. The automated NAT subnet support method of claim 20 further comprising the step of tracking alternate non-conflicting source addresses.

22. The automated NAT subnet support method of claim 20 further comprising the step of storing alternate non-conflicting destination addresses.

23. The automated NAT subnet support method of claim 20 wherein appropriate network address translations are performed between alternative non-conflicting addresses and original primary LAN addresses.

24. The automated NAT subnet support method of claim 19 wherein step e further comprising the steps of:
   examining a source identifier in a communication frame; and
   comparing said source identifier to addresses included in primary LAN addresses of said NAT.

25. The automated NAT subnet support method of claim 19 wherein step e further comprising the steps of:
   analyzing a destination identifier in a communication frame; and
   contrasting said destination identifier to addresses included in primary LAN addresses of said NAT.

26. The automated NAT subnet support method of claim 19 wherein step f further comprising the step of providing an alternative non-conflicting destination address to the requesting device.

27. The automated NAT subnet support method of claim 19 wherein step f further comprising the step of supplying an alternative non-conflicting source address to a receiving device.

\* \* \* \* \*